United States Patent
Way et al.

(10) Patent No.: US 11,227,316 B2
(45) Date of Patent: Jan. 18, 2022

(54) VENDOR RECOMMENDATION PLATFORM

(71) Applicant: Capital One Services, LLC, McLean, VA (US)

(72) Inventors: Brendan Way, Brooklyn, NY (US); Taurean Butler, Brooklyn, NY (US); Abdelkader M'Hamed Benkreira, New York, NY (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/750,737

(22) Filed: Jan. 23, 2020

(65) Prior Publication Data
US 2021/0233123 A1 Jul. 29, 2021

(51) Int. Cl.
*G06Q 30/02* (2012.01)
*G06Q 20/28* (2012.01)
*G06Q 20/40* (2012.01)

(52) U.S. Cl.
CPC ......... *G06Q 30/0282* (2013.01); *G06Q 20/28* (2013.01); *G06Q 20/40* (2013.01)

(58) Field of Classification Search
CPC ............... G06Q 10/02; G06Q 10/1095; G06Q 30/0282; G06Q 50/12
See application file for complete search history.

(56) References Cited

U.S. PATENT DOCUMENTS

| | | | | |
|---|---|---|---|---|
| 9,373,131 B1* | 6/2016 | Hosny | ............... | G06F 16/24575 |
| 2009/0271246 A1* | 10/2009 | Alvarez | ............... | G06Q 30/02 |
| | | | | 705/7.29 |
| 2012/0109749 A1* | 5/2012 | Subramanian | ..... | G06Q 30/0255 |
| | | | | 705/14.53 |
| 2013/0090959 A1* | 4/2013 | Kvamme | ............... | G06Q 10/02 |
| | | | | 705/5 |
| 2013/0332284 A1* | 12/2013 | Faith | .................. | G06Q 30/0225 |
| | | | | 705/14.66 |
| 2014/0223575 A1* | 8/2014 | Nandi | ................ | G06Q 30/0282 |
| | | | | 726/27 |

(Continued)

FOREIGN PATENT DOCUMENTS

WO 2014/049884 A1 4/2014

OTHER PUBLICATIONS

Badsha, et al., Privacy Preserving User-based Recommender System, 2017 IEEE 37th International Conference on Distributed Computing Systems, pp. 1074-1083 (Year: 2017).*

*Primary Examiner* — Daniel Vetter
(74) *Attorney, Agent, or Firm* — Harrity & Harrity, LLP

(57) ABSTRACT

A device may access payment data of a first payment account and a second payment account that are associated with a first user and a second user, respectively, wherein the payment data includes descriptions of payments to vendors. The device may group the vendors into subsets of vendors based on characteristics of the vendors. The device may determine relative weightings for respective vendors within the subsets. The device may receive a request for a vendor recommendation for a meeting between the first user and the second user, wherein the request identifies parameters for the meeting. The device may generate the vendor recommendation for the meeting by identifying candidate vendors based on the parameters for the meeting and selecting one or more of the candidate vendors based on the relative weightings for the respective vendors.

20 Claims, 8 Drawing Sheets

(56) References Cited

U.S. PATENT DOCUMENTS

| | | | |
|---|---|---|---|
| 2014/0236792 A1* | 8/2014 | Pant | G06Q 40/02 |
| | | | 705/35 |
| 2015/0363840 A1* | 12/2015 | Gupta | G06Q 30/0282 |
| | | | 705/347 |
| 2016/0155156 A1* | 6/2016 | Gopal | G06Q 30/0282 |
| | | | 705/14.66 |
| 2016/0283992 A1* | 9/2016 | Zamer | G06Q 30/0625 |
| 2016/0321705 A1* | 11/2016 | Scheidelman | G06Q 30/0269 |
| 2016/0335700 A1* | 11/2016 | Fomine | G06Q 30/0601 |
| 2017/0076324 A1* | 3/2017 | Waldron | G06Q 30/0255 |
| 2017/0083954 A1* | 3/2017 | Kurtz | G06Q 30/0623 |
| 2017/0199998 A1* | 7/2017 | Bruno | H04L 63/107 |
| 2017/0300948 A1* | 10/2017 | Chauhan | G06Q 30/0201 |
| 2018/0285945 A1* | 10/2018 | Gupta | G06Q 30/0282 |
| 2018/0285969 A1* | 10/2018 | Busch | G06Q 40/025 |
| 2018/0293489 A1* | 10/2018 | Eyster | G06Q 30/0631 |
| 2019/0012601 A1* | 1/2019 | Hong | G06Q 30/0278 |
| 2019/0186934 A1* | 6/2019 | Lee | G01C 21/3484 |
| 2020/0050976 A1* | 2/2020 | Lowe | G06Q 20/102 |
| 2020/0074524 A1* | 3/2020 | Smith | G06Q 50/12 |

* cited by examiner

VENDOR RECOMMENDATION PLATFORM

BACKGROUND

After agreeing to a meeting, such as a lunch with friends, a date, or a business lunch, participants of the meeting may exchange multiple communications to decide on a vendor for the meeting. In some instances, one participant may select the vendor based on the one participant's preferences, which may conflict with another participant's preferences. The preferences may conflict based on any number of criteria, such as a type of food served by the vendor, a price range for goods or services offered by the vendor, and/or the like.

SUMMARY

According to some implementations, a method may include accessing, by a device, payment data of a first payment account and a second payment account that are associated with a first user and a second user, respectively, wherein first payment data of the payment data includes descriptions of first payments to a first set of vendors and wherein second payment data of the payment data includes descriptions of second payments to a second set of vendors, wherein the first user is associated with a first user device and the second user is associated with a second user device; grouping, by the device, the first set of vendors into first subsets of vendors and the second set of vendors into second subsets of vendors based on one or more of categories of vendor types, vendor names, amounts of payments to the vendors, times of day of the payments, or locations of vendors of the first set of vendors and the second set of vendors; determining, by the device, first relative weightings for respective vendors within the first subsets and second relative weightings for respective vendors within the second subsets based on one or more of a quantity of payments to the respective vendors, a quantity of payments to the respective vendors within a time period, or a timing of a most recent payment to the respective vendors; receiving, by the device, a request for a vendor recommendation for a meeting between the first user and the second user, wherein the request identifies parameters for the meeting, and wherein the parameters comprise one or more of a time of the meeting, a meeting type, a vendor type, a geographical area for the meeting, or a desired price range for the meeting; generating, by the device, the vendor recommendation for the meeting by identifying candidate vendors based on the parameters for the meeting and selecting one or more of the candidate vendors based on the first relative weightings and the second relative weightings; and providing, by the device and to at least one of the first user device or the second user device, the vendor recommendation for the meeting.

According to some implementations, a device may include one or more memories; and one or more processors, communicatively coupled to the one or more memories, configured to: access payment data of a first payment account and a second payment account that are associated with a first user and a second user, respectively, wherein first payment data of the payment data includes descriptions of first payments to a first set of vendors and wherein second payment data of the payment data includes descriptions of second payments to a second set of vendors, wherein the first user is associated with a first user device and the second user is associated with a second user device; group the first set of vendors into first subsets of vendors and the second set of vendors into second subsets of vendors based on one or more of categories of vendor types, vendor names, amounts of payments to the vendors, times of day of the payments, or locations of the vendors; determine first relative weightings for respective vendors within the first subsets and second relative weightings for respective vendors within the second subsets based on one or more of a quantity of payments to the respective vendors, a quantity of payments to the respective vendors within a time period, or a timing of a most recent payment to the respective vendors; receive a request for a vendor recommendation for a meeting between the first user and the second user, wherein the request identifies parameters for the meeting, and wherein the parameters include one or more of a time of the meeting, a meeting type, a vendor type, a geographical area for the meeting, or a desired price range for the meeting; generate the vendor recommendation for the meeting by identifying candidate vendors based on the parameters for the meeting and selecting, using a machine learning process, one or more of the candidate vendors, wherein the machine learning process uses a vendor recommendation model trained based on historical outcomes of providing vendor recommendations; and provide, to at least one of the first user device or the second user device, the vendor recommendation for the meeting.

According to some implementations, a non-transitory computer-readable medium may store one or more instructions. The one or more instructions, when executed by one or more processors of a device, may cause the one or more processors to: access payment data of a first payment account and a second payment account that are associated with a first user and a second user, respectively, wherein first payment data of the payment data includes descriptions of first payments to a first set of vendors and wherein second payment data of the payment data includes descriptions of second payments to a second set of vendors, wherein the first user is associated with a first user device and the second user is associated with a second user device; receive a request for a vendor recommendation for a meeting between the first user and the second user, wherein the request identifies parameters for the meeting, and wherein the parameters comprise one or more of a time of the meeting, a meeting type, a vendor type, a geographical area for the meeting, or a desired price range for the meeting; identify candidate vendors based on the parameters for the meeting; match the candidate vendors with one or more respective vendors of the first set of vendors or the second set of vendors; determine relative weightings for the candidate vendors based on one or more of a quantity of payments to the one or more respective vendors, a quantity of payments to the one or more respective vendors within a time period, or a timing of a most recent payment to the one or more respective vendors; generate the vendor recommendation for the meeting based on the relative weightings for the candidate vendors; and provide, for presentation to at least one of the first user device or the second user device, the vendor recommendation for the meeting.

DETAILED DESCRIPTION

Figure 1A:
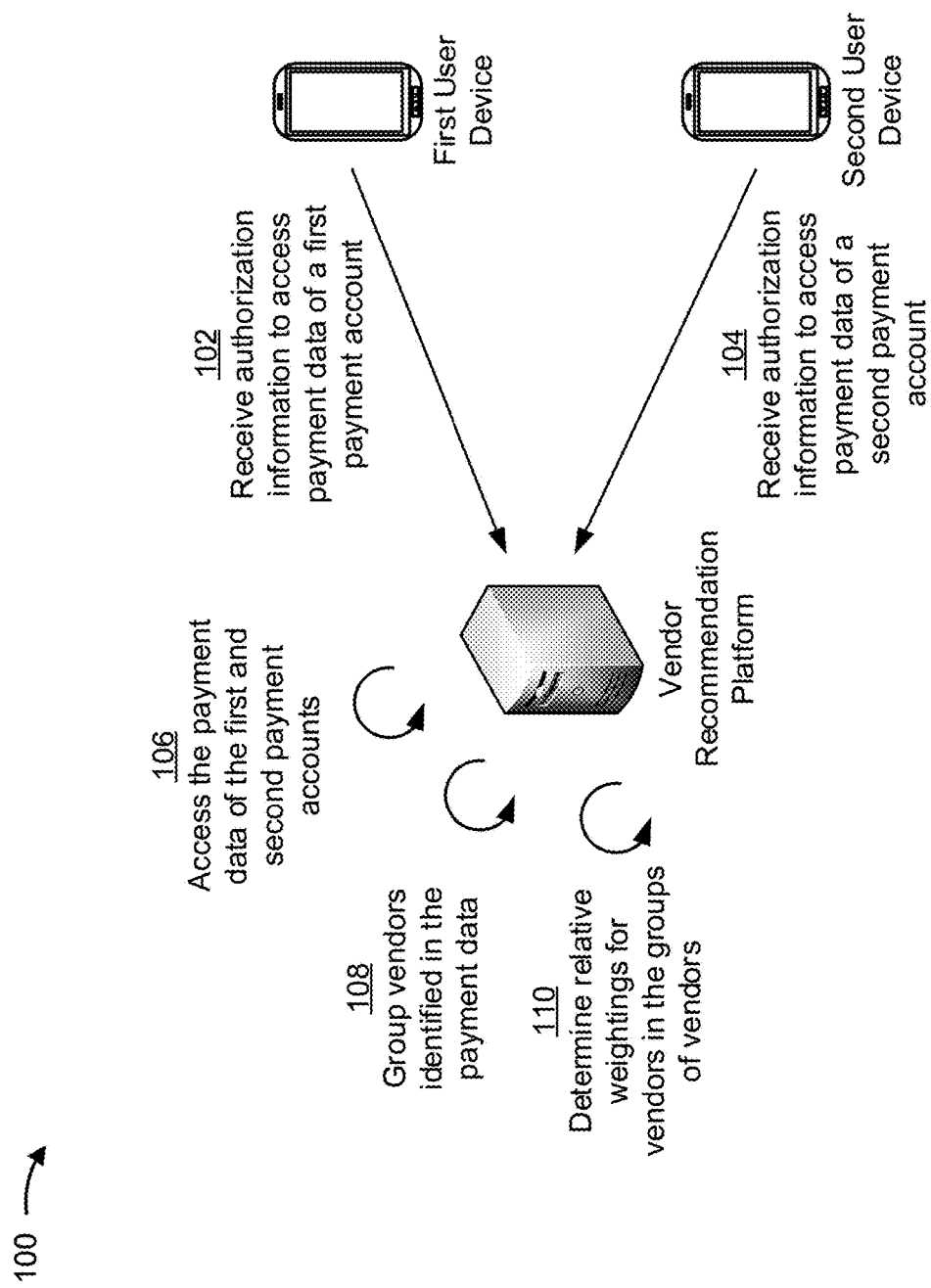
FIGS. 1A-1C are diagrams of one or more example implementations described herein.

The following detailed description of example implementations refers to the accompanying drawings. The same reference numbers in different drawings may identify the same or similar elements.

When a first user of a first user device and a second user of a second user device agree to a meeting (e.g., over a meal perhaps), the first user and the second user may exchange a plurality of communications via the first user device and the second user device to determine a vendor (e.g., restaurant or merchant) for the meeting. For example, the first user may propose a first vendor for the meeting via a first communication from the first user device to the second user device. The second user may reply with a rejection of the first vendor based on the first vendor offering a type of food that the second user does not like. The second user may provide the reply, along with a proposal for a second vendor, to the first user device via a second communication. The first user may reply with a rejection of the second vendor based on the second vendor offering food that is too expensive for the first user. The first user may provide the reply, along with a proposal for a third vendor, to the second user device via a third communication. These communications may continue until the first user and the second user agree on a vendor for the meeting.

This iterative process for determining a vendor for the meeting may unnecessarily consume computing resources (e.g., processor resources, memory resources, communication resources, and/or the like) of the first user device and second user device for generating a plurality of communications. Additionally, the first user and/or second user may unnecessarily consume computing resources of the first user device and/or second device to search for candidate vendors that satisfy criteria for the meeting, such as a time of the meeting, a meeting type, a vendor type, a geographical area for the meeting, a desired price range for the meeting, and/or the like. Further, network resources may be unnecessarily consumed to deliver the plurality of replies, facilitate the searching for vendors, and/or the like.

This disclosure relates to systems and methods for recommending a vendor for a meeting. To determine a recommendation of a vendor for a meeting, a vendor recommendation platform may access first payment data associated with the first user and second payment data related to the second user. The first payment data may include descriptions of payments to a first set of vendors by the first user and the second payment data may include descriptions of payments to a second set of vendors by the second user. The vendor recommendation platform may group the first set of vendors into first subsets of vendors and may group the second set of vendors into second subsets of vendors based on characteristics of the first set of vendors and the second set of vendors. The vendor recommendation platform may determine relative weightings for respective vendors within the first subsets and relative weightings for respective vendors within the second subsets based on the first payment data and the second payment data, respectively.

When the vendor recommendation platform receives a request for a vendor recommendation for a meeting between the first user and the second user, the vendor recommendation platform may generate a vendor recommendation for the meeting. The vendor recommendation may be based on one or more parameters for the meeting, as provided in the request for the vendor recommendation. Additionally, or alternatively, the vendor recommendation may be based on the first relative weightings and the second relative weightings. For example, the vendor recommendation may identify one or more of respective vendors within the first subsets, respective vendors within the second subsets, vendors matched to respective vendors within the first subsets and/or the second subsets, and/or the like. The vendor recommendation platform may provide the vendor recommendation to the first user device and/or the second user device.

In this way, the vendor recommendation platform may conserve computing resources and network resources that may otherwise be used to exchange communications between the first user device and the second user device to determine a vendor for the meeting. Additionally, the vendor recommendation platform may conserve computing resources and network resources that may otherwise be used to search for candidate vendors that fail to satisfy parameters for the meeting.

Figure 1B:
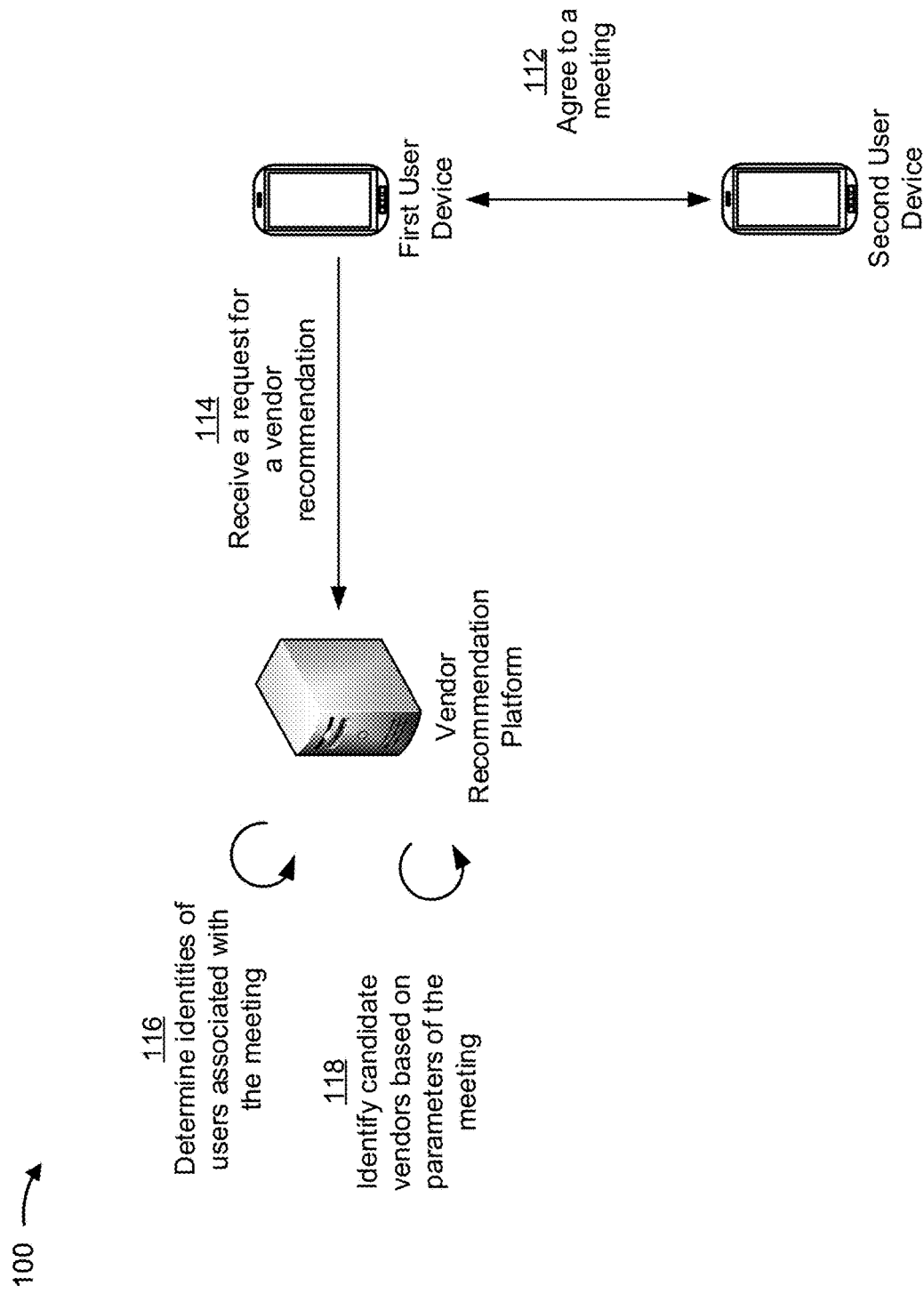
Figure 1C:
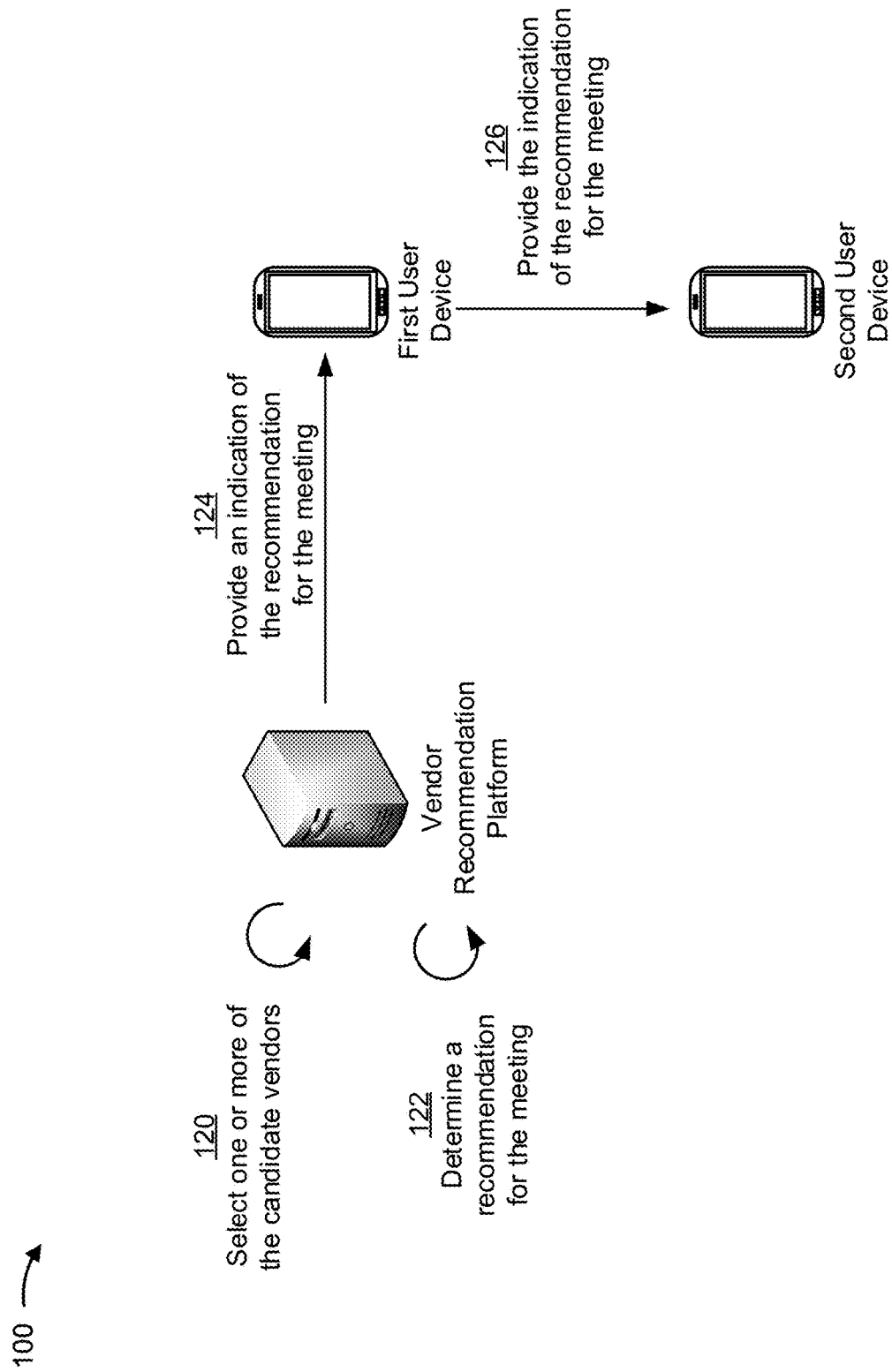

FIGS. 1A-1C are diagrams of one or more example implementations 100 described herein. As shown in FIGS. 1A-1C, the example implementation(s) 100 may include a vendor recommendation platform, a first user device associated with a first user, a second user device associated with a second user, and/or the like.

As shown in FIG. 1A, and by reference number 102, the vendor recommendation platform may receive, from the first user device, authorization information to access payment data of a first payment account. In some implementations, the authorization information may include credentials to access the first payment account. The credentials may be usable by the vendor recommendation platform to access the payment data of the first payment account via a payment account device associated with an account entity (e.g., a payment card issuer, a financial institution, and/or the like) that provides the first payment account to the first user.

In some implementations, the authorization information may include a token, such as an open authorization (oAuth) token. The vendor recommendation platform may use the token to gain limited access to the first payment account. In some implementations, the token may provide limited access to the payment data of the first payment account. For example, the token may provide access that is limited in scope such that the vendor recommendation platform may gain access to transactions within a specified time period (e.g., a quantity of most recent billing cycles), transactions with vendors related to meetings, transactions that are payments, and/or the like. The vendors may be determined to be related to meetings based on a vendor type of the vendor (e.g., vendors categorized as providing entertainment, dining, and/or the like).

In some implementations, the vendor recommendation platform may receive, from the first user device, authorization information to access payment data of a plurality of payment accounts associated with the first user. The plurality of payment accounts may be associated with one or more account entities. The first user device may provide multiple tokens to the vendor recommendation platform, with each token providing access to one or more of the plurality of payment accounts.

As shown by reference number 104, the vendor recommendation platform may receive, from the second user device, authorization information to access payment data of a second payment account. Similar to the authorization information to access payment data of the first payment account, the authorization information to access payment data of the second payment account may include credentials that are usable access the second payment account. The credentials to access the second payment account may include a token, such as an oAuth token, which may provide the vendor recommendation platform with limited access to payment data of the second payment account. In some implementations, the vendor recommendation platform may receive, from the second user device, authorization information to access payment data of a plurality of payment accounts associated with the second user.

As shown by reference number 106, the vendor recommendation platform may access the payment data of the first payment account and the payment data of the second payment account. The payment data of the first payment account may include descriptions of first payments to a first set of vendors. The payment data of the second payment account may include descriptions of second payments to a second set of vendors. In some implementations, the vendor recommendation platform may also access payment data from other payment accounts associated with the first user and/or the second user.

To access the payment data of the first payment account and payment data of the second payment account, the vendor recommendation platform may provide one or more requests, to one or more payment account devices, to access the payment data of the first payment account and/or payment data of the second payment account. The one or more requests may include the authorization information to access the payment data of the first payment account and/or the authorization information to access the second payment account.

As shown by reference number 108, the vendor recommendation platform may group vendors identified in the payment data. In some implementations, the vendor recommendation platform may group the first set of vendors into first subsets of vendors based on one or more categories of vendor types, vendor names, amounts of payments to the vendors, times of day of the payments, locations of vendors, and/or the like. Similarly, the vendor recommendation platform may group the second set of vendors into second subsets of vendors based on one or more categories of vendor types, vendor names, amounts of payments to the vendors, times of day of the payments, locations of vendors, and/or the like.

In some implementations, the vendor recommendation platform may further group the subsets of vendors into smaller subsets. For example, a subset of the first set of vendors may include a first set of restaurants and a subset of the second subsets may include a second set of restaurants. The vendor recommendation platform may further group the first set of restaurants based on types of food, average amount spent in transactions by the first user and/or the second user with restaurants of the first set of restaurants, expected cost ranges for future transactions with the restaurants of the first set of restaurants, locations of the restaurants of the first set of restaurants, and/or the like. Similarly, the vendor recommendation platform may further group the second subset of restaurants based on types of food, average amount spent in transactions with restaurants of the second set of restaurants, expected cost ranges for future transactions with the restaurants of the second set of restaurants, locations of the restaurants of the second set of restaurants, and/or the like.

As shown by reference number 110, the vendor recommendation platform may determine first relative weightings for respective vendors within the first subsets and second relative weightings for respective vendors within the second subsets. The vendor recommendation platform may determine relative weightings based on a quantity of payments to the respective vendors, a quantity of payments to the respective vendors within a time period, timing of most recent payments to the respective vendors, and/or the like. For example, a restaurant that is frequented by the first user, based on payment data indicating frequent payments to the restaurant, may have a relatively high weighting within one or more subsets of the first subsets into which the restaurant is grouped. A restaurant may have a relatively high weighting based on the first user having a relatively high quantity of payments to the restaurant within a threshold period of time (e.g., a quantity of transactions within the past six months).

In some implementations, the vendor recommendation platform may determine subset relative weightings for subsets of the first set of vendors and subset relative weightings for subsets of the second set of vendors. For example, if a subset is a type of good or service within a vendor type, the vendor recommendation platform may provide a subset relative weighting for one or more subsets associated with various goods or services within the vendor type.

In some implementations where one or more of the subsets of the first set of vendors or subsets of the second set of vendors are restaurants grouped by types of food, the vendor recommendation platform may determine relative weightings for subsets of restaurants based on types of food provided by restaurants within the subsets of restaurants. For example, if the first user frequents Italian restaurants more than Mexican restaurants and Chinese restaurants, a subset of vendors that serve Italian food may have a relatively high weighting.

In some implementations, the vendor recommendation platform determines relative weightings for vendors of the first set of vendors separately from the relative weightings for vendors of the second set of vendors. In some implementations, the vendor recommendation platform may determine relative weightings for vendors of a combined set of the first set of vendors and the second set of vendors. For example, the vendor recommendation platform may determine relative weightings of the combined set based on a combined quantity of payments to the respective vendors for the first user and the second user, a combined quantity of payments to the respective vendors within a time period for the first user and the second user, a timing of a most recent payment to the respective vendors for the first user and the second user, and/or the like. The vendor recommendation platform may determine relative weightings for vendors based on receiving input that a user of the first user device and a user of the second user device have agreed to a meeting.

As shown in FIG. 1B, and by reference number 112, the first user device and the second user device may communicate an agreement to a meeting. For example, the first user and the second user may use the first user device and the second user device to communicate to schedule a meeting. In some implementations, the first user device and the second user device may agree to the meeting using an application programming interface of a scheduling application. For example, the first user may send an invitation to the meeting via a calendar application. In some implementations, the first user and the second user may agree to the meeting via an offline communication.

In some implementations, the agreement to meet may include an identification of one or more parameters of the meeting. For example, the parameters may include a time of the meeting, a meeting type, a vendor type, a geographical area for the meeting, a desired price range for the meeting, a date, and/or the like.

As shown by reference number 114, the vendor recommendation platform may receive a request for a vendor recommendation for the meeting between the first user and the second user. In some implementations, the request may identify the first user and the second user as participants in the meeting. The request may identify one or more parameters associated with the meeting. For example, the parameters may include a time of the meeting, a meeting type, a vendor type, a geographical area for the meeting, a desired price range for the meeting, a date, and/or the like.

In some implementations, the first user device and/or the second user device may provide an indication of a privacy level for the meeting. The indication of the privacy level may correspond to an amount of private information to share with participants of the meeting. In some examples, the indication of the privacy level for the meeting may correspond to enabling sharing of different amounts of personal information related to transactions with the first set of vendors and/or information related to transactions with the second set of vendors. For example, if the first user transacts with a particular Italian restaurant every Tuesday, various privacy levels may correspond to sharing, with the second user, that the first user visits the Italian restaurant every Tuesday (low privacy level), that the first user regularly visits the Italian restaurant (intermediate privacy level), that the first user likes Italian food (high privacy level), and/or the like.

As shown by reference number 116, the vendor recommendation platform may determine identities of users associated with the meeting. In some implementations, the vendor recommendation platform may determine the identities of the first user and the second user based on identifications of the participants of the meeting, as provided with the request. The identifications may include a phone number, a name, an address, an identifier associated with the authorization information, an account identifier, and/or the like.

As shown by reference number 118, the vendor recommendation platform may identify candidate vendors based on the parameters of the meeting. In some implementations, the parameters may identify a time of the meeting, a meeting type, a vendor type, a geographical area for the meeting, a desired price range for the meeting, and/or the like. The vendor recommendation platform may filter out vendors from the first set of vendors and/or the second set of vendors that fail to satisfy the parameters of the meeting and/or select vendors, from a set of available vendors, that satisfy the parameters of the meeting as candidate vendors.

In some implementations, the vendor recommendation platform may determine a desired price range for the meeting (e.g., without explicit definition in the parameters for the meeting) based on the payment data of the first payment account, the payment data of the second payment account, and/or payment data of respective payment accounts of any other participants of the meeting. For example, the vendor recommendation platform may determine a desired price range for the meeting by determining an average, median, and/or the like price range of payments made to vendors that satisfy some or all of the parameters of the meeting. In some implementations, the vendor recommendation platform may identify payments within a similar time of day as the meeting (e.g., breakfast time, lunch time, dinner time, late night time, and/or the like), for a same or similar meeting type (e.g., date, meeting with friends, and/or the like), to a same or similar vendor type (e.g., gaming center, restaurant, Italian restaurant, and/or the like), to a vendor within a same or similar geographical area, and/or the like.

The vendor recommendation platform may match the candidate vendors with vendors of the first set of vendors and/or vendors of the second set of vendors. In some implementations, the vendor recommendation platform matches the candidate vendors based on common characteristics of the candidate vendors and the vendors of the first set of vendors and/or the vendors of the second set of vendors. The common characteristics may relate to a vendor type, a vendor name, an expected cost range, a location, and/or the like. For example, a candidate vendor may be an Italian restaurant that is a vendor of the first set of vendors, but not a vendor of the second set of vendors. The Italian restaurant may be matched to the Italian restaurant for the first set of vendors. The Italian restaurant may be matched to other Italian restaurants of the first set of vendors and the second set of vendors based on the vendor type being an Italian restaurant, having the same expected cost range as the other Italian restaurants, and/or the like. For example, the second user may frequent an Italian restaurant within a particular geographical location, the meeting may include a parameter that the location of the meeting is outside of the particular geographical location, and the vendor recommendation platform may match an Italian restaurant within the location of the meeting to the Italian restaurant within the particular geographical location.

In this way, the vendor recommendation platform is able to recommend a vendor that is likely to be accepted by the first user and the second user, which may conserve computing and network resources that may otherwise be used to exchange communications while determining a suitable vendor for the meeting.

As shown in FIG. 1C, and by reference number 120, the vendor recommendation platform may select one or more of the candidate vendors. In some implementations, the vendor recommendation platform may select the one or more of the candidate vendors based on the first relative weightings and the second relative weightings. In some implementations, the vendor recommendation platform may select the one or more of the candidate vendors based on matching the one or more of the candidate vendors to vendors of the first set of vendors and/or vendors of the second set of vendors. In some implementations, the vendor recommendation platform may select one or more of the candidate vendors based on In some implementations, the vendor recommendation platform may select the one or more candidate vendors using a machine learning process. As described herein, the vendor recommendation platform may use one or more artificial intelligence techniques, such as machine learning, deep learning, and/or the like to select one or more candidate vendors for a vendor recommendation.

In some implementations, the vendor recommendation platform may parse natural language descriptions of characteristics of candidate vendors provided in a plurality of historical vendor recommendations for meetings, characteristics of vendors with relative weightings described in payment accounts of participants to the meetings, and/or the like. For example, the vendor recommendation platform may obtain data identifying, in natural language, descriptions of vendor types, vendor names, amounts of payments, times of day of the payments, locations of candidate vendors provided in a plurality of historical vendor recommendations for meetings, vendors with relative weightings, and/or the like.

In some implementations, the vendor recommendation platform may determine characteristics of candidate vendors provided in a plurality of historical vendor recommendations for meetings, characteristics of vendors with relative weightings, and/or the like based on natural language processing of unstructured data, which may include a description of the characteristics of the candidate vendors provided in a plurality of the historical vendor recommendations for meetings, characteristics of vendors with relative weightings, and/or the like. For example, based on a description of a candidate vendor or a vendor with a relative weighting vendor being "Giovanni's Italian Restaurant", the vendor recommendation platform may use natural language processing to determine that characteristics of the vendor include that a vendor type of the vendor is a restaurant and that a type of food is Italian.

In this way, the vendor recommendation platform may identify characteristics (e.g., similarities between vendors of the vendor recommendation and vendors with relative weightings) associated with successful vendor recommendations (e.g., resulting in an increased likelihood of users accepting the vendor recommendation), as described herein. Based on applying a rigorous and automated process associated with identifying characteristics associated with successful vendor recommendations, the vendor recommendation platform enables recognition and/or identification of thousands or millions of parameters for thousands or millions of combinations of characteristics of one or more of vendors with relative weightings described in a payment account of a participant of a historical meeting, candidate vendors identified based on parameters of a historical meeting, and/or the like, thereby increasing an accuracy and consistency of selecting one or more candidate vendors to recommend in a vendor recommendation that results in a relatively high likelihood of the users accepting the vendor recommendation, relative to requiring computing resources to be allocated for hundreds or thousands of technicians to manually identify one or more user devices having a relatively high likelihood of accepting the vendor recommendation, based on the thousands or millions of combinations of characteristics of one or more of characteristics of a plurality of candidate vendors of historical vendor recommendations, characteristics of a plurality of vendors with relative weightings, and/or the like.

In some implementations, the vendor recommendation platform may determine whether characteristics of one or more of characteristics of a plurality of candidate vendors of historical vendor recommendations, characteristics of a plurality of vendors with relative weightings, and/or the like correspond to an increased likelihood of successfully providing a particular vendor recommendation, as described herein. For example, using relationships among characteristics of historical vendor recommendations, historical vendors with relative weightings, and/or the like, the vendor recommendation platform may determine whether a particular candidate vendor has a relatively high likelihood of being accepted by the participants of the meeting.

In this case, the vendor recommendation platform may generate a vendor recommendation model. For example, the vendor recommendation platform or another device may train a vendor recommendation model using information that includes a plurality of characteristics of historical vendor recommendations, a plurality of characteristics of a plurality of vendors with relative weightings described in payment data of participants of a plurality of historical meetings, historical outcomes (e.g., acceptance or rejection of the historical vendor recommendations) and/or the like, to determine whether a particular vendor of a vendor recommendation has a relatively high likelihood of being accepted by participants of a particular meeting. As an example, the vendor recommendation platform may determine that relationships among characteristics of historical vendor recommendations and characteristics of vendors with relative weightings described in payment data of a participant of the associated historical meeting are associated with a threshold probability of being associated with a relatively high, or increased, likelihood of the particular vendor of the vendor recommendation being accepted by participants of the particular meeting.

In some implementations, the vendor recommendation platform may use a scoring system (e.g., with relatively high scores and/or relatively low scores) to identify and/or classify relationships among characteristics of historical vendor recommendations and characteristics of vendors with relative weightings described in payment data of a participant of an associated historical meeting as being associated with a relatively high, or increased, likelihood of the vendor recommendation being accepted by the participants of the meeting. In this case, the vendor recommendation platform may determine that a relatively high score (e.g., as being likely to be accepted) is to be assigned to relationships among characteristics of historical vendor recommendations and characteristics of vendors with relative weightings that are determined to be the same or similar as previously identified relationships among characteristics of historical vendor recommendations and characteristics of historical vendors with relative weightings that resulted in a relatively high, or increased, likelihood of the vendor recommendation being accepted by the participants of the meeting (or more frequently accepted than for past identified relationships). In contrast, the vendor recommendation platform may determine that a relatively low score (e.g., as being unlikely to be accepted) is to be assigned to relationships among characteristics of historical vendor recommendations and characteristics of vendors with relative weightings that are determined to be different than previously identified relationships among characteristics of historical vendor recommendations and characteristics of vendors with relative weightings that resulted in a relatively high, or increased, likelihood of the vendor recommendation being accepted by the participants of the meeting (or less frequently accepted than for past identified relationships).

In some implementations, the vendor recommendation platform may perform a data preprocessing operation when generating the vendor recommendation model. For example, the vendor recommendation platform may preprocess data (e.g., data that includes information and/or parameters associated with characteristics of the historical vendor recommendations, characteristics of a plurality of vendors with relative weightings, and/or the like) to remove non-ASCII characters, white spaces, confidential data (e.g., personally identifiable information, transaction account identifiers, and/or the like), and/or the like. In this way, the vendor recommendation platform may organize thousands, millions, or billions of data entries for machine learning and model generation.

In some implementations, the vendor recommendation platform may perform a training operation when generating the vendor recommendation model. For example, the vendor recommendation platform may portion information regarding relationships among characteristics of historical vendor recommendations and characteristics of vendors with relative weightings into a training set (e.g., a set of data to train the vendor recommendation model), a validation set (e.g., a set of data used to evaluate a fit of the vendor recommendation model and/or to fine tune the vendor recommendation model), a test set (e.g., a set of data used to evaluate a final fit of the vendor recommendation model), and/or the like. In some implementations, the vendor recommendation platform may preprocess and/or perform dimensionality reduction to reduce the information regarding relationships among characteristics of historical vendor recommendations and characteristics of vendors with relative weightings to a minimum feature set. In some implementations, the vendor recommendation platform or another device may train the vendor recommendation model on this minimum feature set, thereby reducing processing to train the machine learning model, and may apply a classification technique to the minimum feature set.

In some implementations, the vendor recommendation platform may use a classification technique, such as a logistic regression classification technique, a random forest classification technique, a gradient boosting machine learning (GBM) technique, and/or the like, to determine a categorical outcome (e.g., that a particular vendor of a vendor recommendation has a relatively high likelihood of being accepted by participants of a particular meeting, that a particular vendor of the vendor recommendation does not have a relatively high likelihood of being accepted by participants of a particular meeting, and/or the like). Additionally, or alternatively, the vendor recommendation platform may use a naïve Bayesian classifier technique. In this case, the vendor recommendation platform may perform binary recursive partitioning to split the data of the minimum feature set into partitions and/or branches and use the partitions and/or branches to perform predictions (e.g., that a particular vendor of a vendor recommendation has a relatively high likelihood of being accepted by participants of a particular meeting, and/or the like). Based on using recursive partitioning, the vendor recommendation platform may reduce utilization of computing resources relative to manual, linear sorting and analysis of data items, thereby enabling use of thousands, millions, or billions of data items to train a vendor recommendation model, which may result in a more accurate model than using fewer data items.

Additionally, or alternatively, the vendor recommendation platform may use a support vector machine (SVM) classifier technique to generate a non-linear boundary between data items in the training set. In this case, the non-linear boundary is used to classify test data (e.g., data relating relationships among characteristics of historical vendor recommendations and characteristics of vendors with relative weightings) into a particular class (e.g., a class indicating that a particular vendor of a vendor recommendation has a relatively high likelihood of being accepted by participants of a particular meeting, a class indicating that a particular user device does not have a relatively high likelihood of being accepted by participants of the particular meeting, and/or the like).

Additionally, or alternatively, where the test data includes image data, video data, and/or the like, the vendor recommendation platform may use a computer vision technique, such as a convolutional neural network technique, to assist in classifying test data (e.g., data relating to relationships among characteristics of historical vendor recommendations and characteristics of vendors with relative weightings) into a particular class (e.g., a class indicating that a particular vendor of a vendor recommendation has a relatively high likelihood of being accepted by participants of a particular meeting, a class indicating that a particular vendor of a vendor recommendation does not have a relatively high likelihood of being accepted by participants of a particular meeting, and/or the like). In some cases, the computer vision technique may include using an image recognition technique (e.g., an Inception framework, a ResNet framework, a Visual Geometry Group (VGG) framework, and/or the like), an object detection technique (e.g., a Single Shot Detector (SSD) framework, a You Only Look Once (YOLO) framework, and/or the like), an object in motion technique (e.g., an optical flow framework and/or the like), and/or the like.

Additionally, or alternatively, the vendor recommendation platform or another device may train the vendor recommendation model using a supervised training procedure that includes receiving input to the vendor recommendation model from a subject matter expert, which may reduce an amount of time, an amount of processing resources, and/or the like to train the vendor recommendation model, relative to an unsupervised training procedure. In some implementations, the vendor recommendation platform may use one or more other model training techniques, such as a neural network technique, a latent semantic indexing technique, and/or the like. For example, the vendor recommendation platform may perform an artificial neural network processing technique (e.g., using a two-layer feedforward neural network architecture, a three-layer feedforward neural network architecture, and/or the like) to perform pattern recognition with regard to patterns of whether characteristics of historical vendor recommendations and characteristics of vendors with relative weightings described using different semantic descriptions correspond to whether a particular vendor of a vendor recommendation has a relatively high likelihood of being accepted by participants of a particular meeting or not. In this case, using the artificial neural network processing technique may improve an accuracy of a vendor recommendation model (e.g., the vendor recommendation model) generated by the vendor recommendation platform by being more robust to noisy, imprecise, or incomplete data, and by enabling the vendor recommendation platform to detect patterns and/or trends undetectable to human analysts or systems using less-complex techniques.

As an example, the vendor recommendation platform may use a supervised multi-label classification technique to train the vendor recommendation model. For example, as a first step, the vendor recommendation platform may map relationships among characteristics of historical vendor recommendations and characteristics of vendors with relative weightings. In this case, the relationships may be characterized as corresponding to whether a particular vendor of a vendor recommendation has a relatively high likelihood of being accepted by participants of a particular meeting based on characteristics of the relationships (e.g., whether a relationship is similar to or associated with a relationship that corresponds to an indication of whether a particular vendor of a vendor recommendation has a relatively high likelihood of being accepted by participants of a particular meeting) and an analysis of the characteristics of historical vendor recommendations and characteristics of vendors with relative weightings (e.g., by a technician, thereby reducing processing relative to the vendor recommendation platform being required to analyze each activity).

As a second step, the vendor recommendation platform may determine classifier chains, whereby labels of target variables may be correlated (e.g., in this example, labels may be relationships among characteristics of historical vendor recommendations and characteristics of vendors with relative weightings, and correlation may refer to a common relationship that indicates whether a particular vendor of a vendor recommendation has a relatively high likelihood of being accepted by participants of a particular meeting). In this case, the vendor recommendation platform may use an output of a first label as an input for a second label (as well as one or more input features, which may be other data relating to the relationships among characteristics of historical vendor recommendations and characteristics of vendors with relative weightings), and may determine that a relationship that includes a set of characteristics (some of which are associated with the particular vendor recommendation, vendors with relative weightings, and/or the like, and some of which are not associated with the particular vendor recommendation, vendors with relative weightings, and/or the like) are associated with the particular outcome that the relationship indicates whether a particular vendor of a vendor recommendation has a relatively high likelihood of being accepted by participants of a particular meeting, based on a similarity to other relationships that include similar characteristics. In this way, the vendor recommendation platform transforms classification from a multilabel-classification problem to multiple single-classification problems, thereby reducing processing utilization.

As a third step, the vendor recommendation platform may determine a Hamming Loss Metric relating to an accuracy of a label in performing a classification by using the validation set of the data. For example, an accuracy with which a weighting applied to each relationship between characteristics of historical vendor recommendations and characteristics of vendors with relative weightings and whether each relationship is associated with indicating whether a particular vendor of a vendor recommendation has a relatively high likelihood of being accepted by participants of a particular meeting or not, results in a correct prediction of whether a particular vendor of a vendor recommendation has a relatively high likelihood of being accepted by participants of a particular meeting, thereby accounting for differing amounts to which association of any one relationship influences the prediction of whether a particular vendor of a vendor recommendation has a relatively high likelihood of being accepted by participants of a particular meeting.

As a fourth step, the vendor recommendation platform may finalize the vendor recommendation model based on labels that satisfy a threshold accuracy associated with the Hamming Loss Metric and may use the vendor recommendation model for subsequent prediction of whether relationships among characteristics of historical vendor recommendations and characteristics of vendors with relative weightings are to result in a particular vendor of a vendor recommendation having a relatively high likelihood of being accepted by participants of the meeting.

As another example, the vendor recommendation platform may determine, using a linear regression technique, that a threshold percentage of relationships, in a set of relationships, do not result in a particular vendor of a vendor recommendation having a relatively high likelihood of being accepted by participants of the meeting, and may determine that those relationships are to receive relatively low association scores. In contrast, the vendor recommendation platform may determine that another threshold percentage of relationships do result in a particular vendor of a vendor recommendation having a relatively high likelihood of being accepted by participants of the meeting, and may assign a relatively high association score to those relationships. Based on the relationships resulting in a particular user device having a relatively high likelihood of accepting a particular vendor recommendation or not, the vendor recommendation platform may generate the vendor recommendation model and may use the vendor recommendation model for analyzing new relationships among characteristics of historical vendor recommendations and characteristics of vendors with relative weightings, and/or the like that the vendor recommendation platform identifies.

In some implementations, a different device, such as a server device, may generate and train the vendor recommendation model. The different device may provide the vendor recommendation model for use by the vendor recommendation platform. The different device may update and send (e.g., on a scheduled basis, on an on-demand basis, on a triggered basis, on a periodic basis, and/or the like) the vendor recommendation model to the vendor recommendation platform.

Accordingly, the vendor recommendation platform may use any number of artificial intelligence techniques, machine learning techniques, deep learning techniques, and/or the like to determine whether a particular vendor of a vendor recommendation has a relatively high likelihood of being accepted by participants of a particular meeting.

By intelligently selecting vendors for a vendor recommendation, the vendor recommendation platform may conserve computing resources that might otherwise be used by the first user device and/or the second user device to search for, propose, discuss, and select a vendor from all vendors satisfying the parameters for the meeting.

As shown by reference number 122, the vendor recommendation platform may generate a recommendation for the meeting. In some implementations, the recommendation for the meeting may be based on the selection of the one or more candidate vendors. In some implementations, the recommendation may be based further on determining one or more incentives associated with one or more of the selected one or more candidate vendors. In some implementations, the one or more candidate vendors may include a candidate vendor with which one or more of the participants of the meeting have not had transactions based on the payment data. In other words, the vendor recommendation platform may recommend a candidate vendor that is new to one or more of the participants of the meeting based on the payment data (e.g., based on similarities between the new candidate vendor and vendors identified in payment data).

As shown by reference number 124, the vendor recommendation platform may provide an indication of the recommendation for the meeting. In some implementations, the vendor recommendation platform may provide the indication via an interactive webpage, an application programming interface, a text or media message, and/or the like. In some implementations, the vendor recommendation platform may provide an indication of one or more incentives associated with one or more of the vendors identified in the recommendation.

In some implementations, the vendor recommendation comprises identification of one or more alternative vendors for the meeting. The one or more alternative vendors may be selectable by the first user device and/or the second user device. In some implementations, the first user device and/or the second user device may provide an indication of a selection of an alternative vendor of the one or more alternative vendors. For example, the first user device and/or the second user device may provide the indication of the selection via an interactive webpage, an application programming interface, a text or media message, and/or the like.

Based on receiving the indication of the selection, the vendor recommendation platform may provide an invitation to the meeting, an update to an existing invitation to the meeting, a notification via an application interface, and/or the like to indicate the selection to the first user device, the second user device, and/or devices of other participants of the meeting. Additionally, the vendor recommendation platform may update a vendor recommendation model based on the selection of the alternative vendor.

In some implementations, the vendor recommendation platform may provide an interface for requesting, from a vendor associated with the vendor recommendation, a reservation for the meeting. For example, the vendor recommendation platform may provide an interface via an application programming interface, an interactive webpage, and/or the like to create a reservation. In some examples, the vendor recommendation platform may provide a selectable link to contact information for the vendor.

In some implementations, the vendor recommendation includes a justification for the vendor recommendation. The justification may identify information regarding at least one of the first payments or the second payments. For example, the justification may describe information relating to one or more of the first payments and/or one or more of the second payments. The justification may indicate that the first user and the second user have visited the vendor a quantity of times within a period of time. An amount of personal information to provide along with the vendor recommendation may be based on an indication of a privacy level as indicated by the first user device and/or the second user device. In some implementations, the indication of the privacy level may be provided along with the request for the vendor recommendation. In some implementations, the indication of the privacy level may be provided along with the authorization information to access payment data of the first payment account and/or the second payment account. The indication of the privacy level provided along with the authorization information may associate a privacy level with a meeting type. For example, the indication of the privacy level may associate a first date with a high privacy level (authorization to share a minimal amount of personal information).

By providing a limited amount of private information to participants of the meeting, the vendor recommendation platform can reduce a likelihood of fraudulent activity occurring based on a malefactor obtaining the personal information. This can reduce a likelihood of unnecessarily consuming computing resources to investigate and recover from fraudulent activity.

As shown by reference number 126, the first user device may provide the indication of the recommendation for the meeting to the second user device and/or any devices associated with any other participants of the meeting.

As indicated above, FIGS. 1A-1C are provided as one or more examples. Other examples may differ from what is described with regard to FIGS. 1A-1C.

Figure 2:
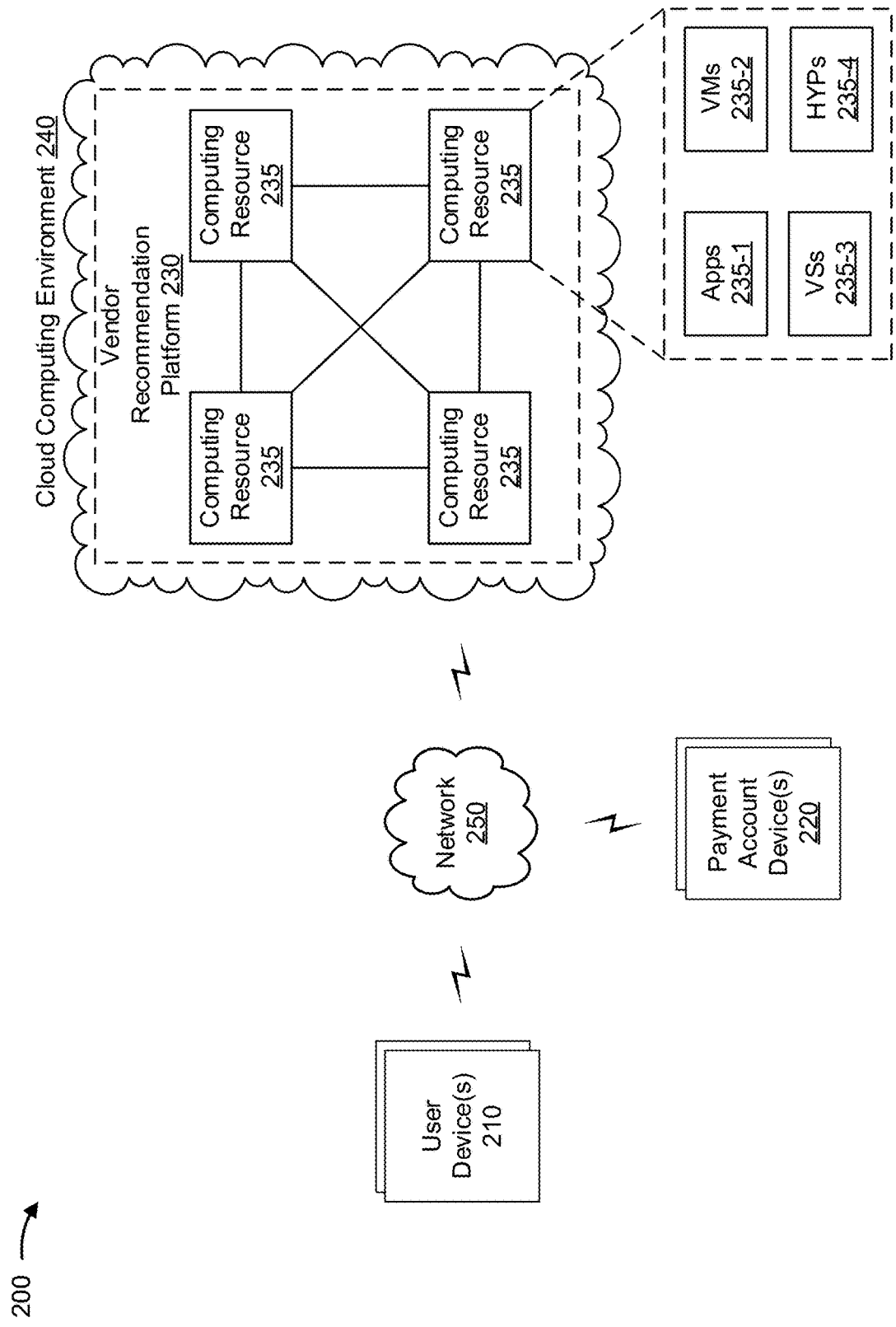
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more user devices 210 (referred to herein individually as user device 210 or collectively as user devices 210), one or more payment account devices (referred to herein individually as payment account device 220 or collectively as payment account devices 220), a vendor recommendation platform 230, a computing resource 235, a cloud computing environment 240, and a network 250. Devices of environment 200 may interconnect via wired connections, wireless connections, or a combination of wired and wireless connections.

User devices 210 include one or more devices capable of receiving, generating, storing, processing, and/or providing information associated with requesting and receiving a vendor recommendation. For example, user device 210 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Payment account devices 220 include one or more devices capable of storing, processing, and/or routing information associated with providing payment data. In some implementations, payment account device 220 may include a communication interface that allows payment account device 220 to receive information from and/or transmit information to other devices in environment 200. In some implementations, the payment account device may be associated with a financial institution or payment card issuer associated with a payment account of a user associated with one or more user devices 210. Payment account device 240 may receive, from the vendor recommendation platform 230, authorization information for accessing payment data. If the authorization information is valid, payment account device 220 may provide the payment data.

Vendor recommendation platform 230 includes one or more computing resources assigned to generate a vendor recommendation for a meeting. For example, vendor recommendation platform 230 may be a platform implemented by cloud computing environment 240 that may generate a vendor recommendation based on parameters for the meeting, relative weightings of vendors described in payment data of participants of the meeting (e.g., one or more users associated with one or more of user devices 210), and/or the like. In some implementations, vendor recommendation platform 230 is implemented by computing resources 235 of cloud computing environment 240.

Vendor recommendation platform 230 may include a server device or a group of server devices. In some implementations, vendor recommendation platform 230 may be hosted in cloud computing environment 240. Notably, while implementations described herein may describe vendor recommendation platform 230 as being hosted in cloud computing environment 240, in some implementations, vendor recommendation platform 230 may be non-cloud-based or may be partially cloud-based.

Cloud computing environment 240 includes an environment that delivers computing as a service, whereby shared resources, services, and/or the like may be provided to generate a vendor recommendation for a meeting. Cloud computing environment 240 may provide computation, software, data access, storage, and/or other services that do not require end-user knowledge of a physical location and configuration of a system and/or a device that delivers the services. As shown, cloud computing environment 240 may include vendor recommendation platform 230 and computing resource 235.

Computing resource 235 includes one or more personal computers, workstation computers, server devices, or another type of computation and/or communication device. In some implementations, computing resource 235 may host vendor recommendation platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with vendor recommendation platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the "guest operating systems" and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
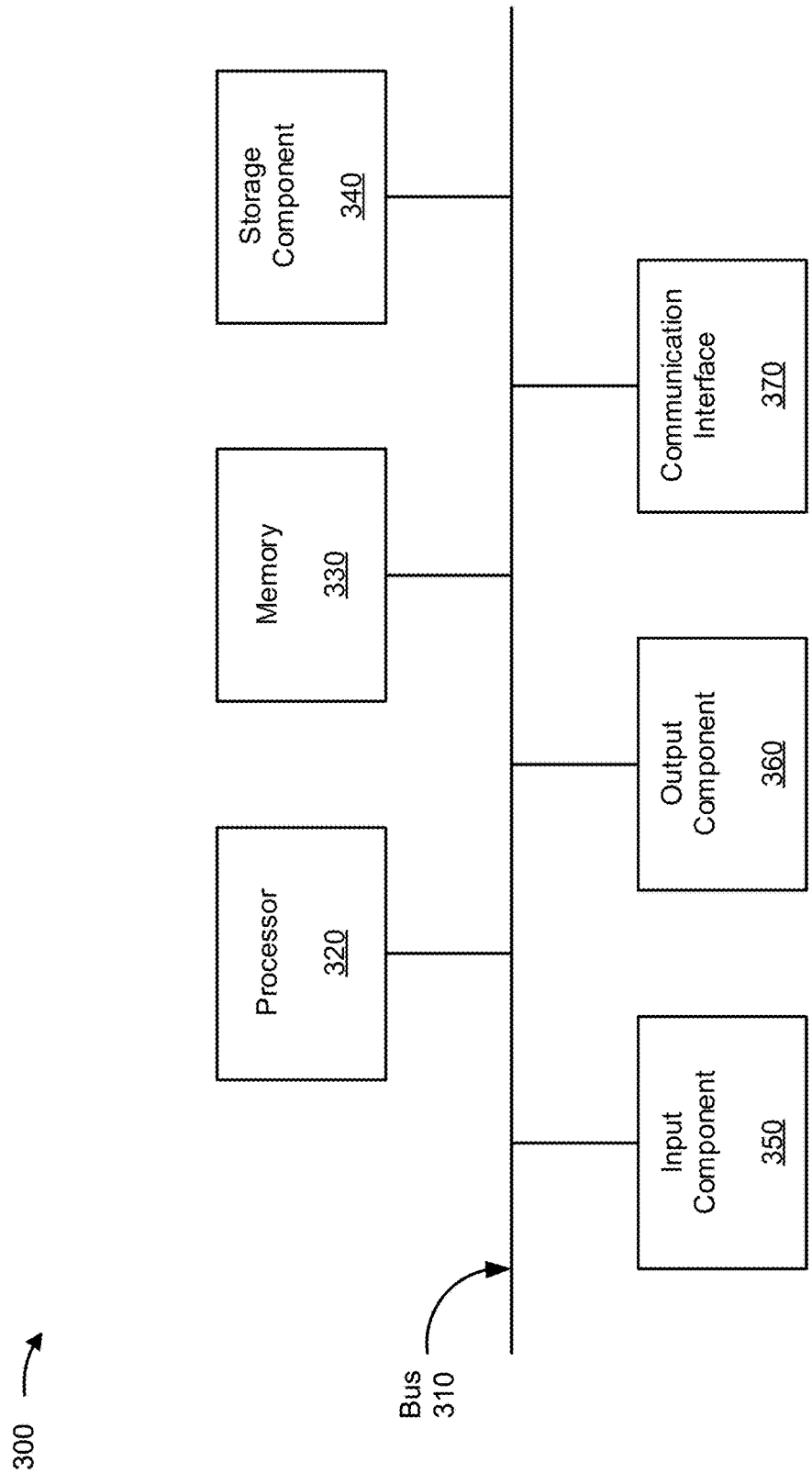
FIG. 3 is a diagram of example components of one or more devices of FIG. 2.

FIG. 3 is a diagram of example components of a device 300. Device 300 may correspond to user device 210, payment account device 220, vendor recommendation platform 230, and/or computing resource 235. In some implementations, user device 210, payment account device 220, vendor recommendation platform 230, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
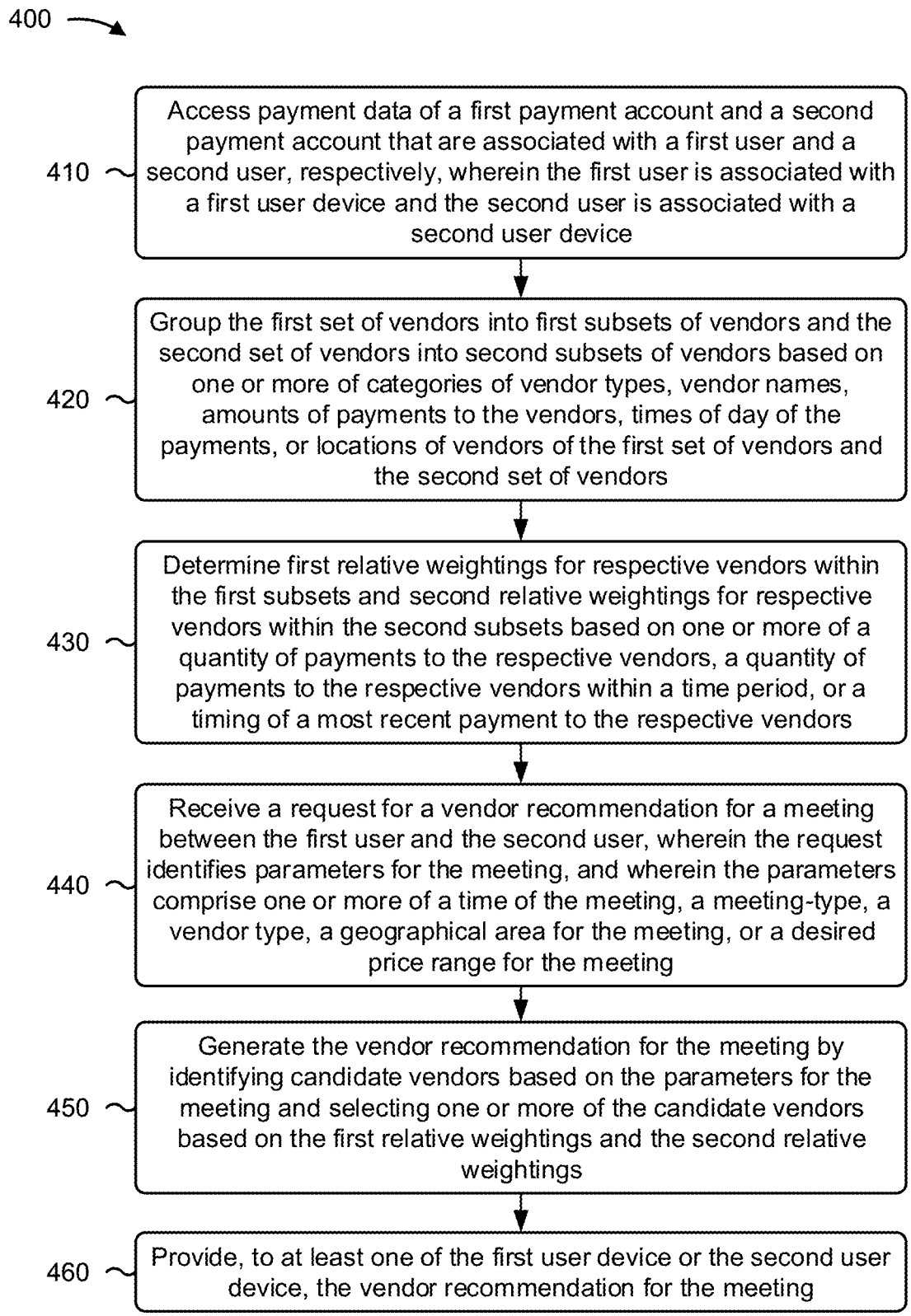
FIGS. 4-6 are flowcharts of example processes for generating a vendor recommendation for a meeting.

FIG. 4 is a flow chart of an example process 400 for generating a vendor recommendation for a meeting. In some implementations, one or more process blocks of FIG. 4 may be performed by a device (e.g., vendor recommendation platform 230). In some implementations, one or more process blocks of FIG. 4 may be performed by another device or a group of devices separate from or including the device, such as a user device (e.g., user device 210), a payment account device (e.g., payment account device 220), and/or the like.

As shown in FIG. 4, process 400 may include accessing payment data of a first payment account and a second payment account that are associated with a first user and a second user, respectively, wherein first payment data of the payment data includes descriptions of first payments to a first set of vendors, and wherein the first user is associated with a first user device and the second user is associated with a second user device (block 410). For example, the device (e.g., using processor 320, memory 330, storage component 340, input component 350, output component 360, communication interface 370 and/or the like) may access payment data of a first payment account and a second payment account that are associated with a first user and a second user, respectively, as described above. In some implementations, first payment data of the payment data includes descriptions of first payments to a first set of vendors. In some implementations, second payment data of the payment data includes descriptions of second payments to a second set of vendors. In some implementations, the first user is associated with a first user device and the second user is associated with a second user device.

As further shown in FIG. 4, process 400 may include grouping the first set of vendors into first subsets of vendors and the second set of vendors into second subsets of vendors based on one or more of categories of vendor types, vendor names, amounts of payments to the vendors, times of day of the payments, or locations of vendors of the first set of vendors and the second set of vendors (block 420). For example, the device (e.g., using processor 320, memory 330, storage component 340, input component 350, output component 360, communication interface 370 and/or the like) may group the first set of vendors into first subsets of vendors and the second set of vendors into second subsets of vendors based on one or more of categories of vendor types, vendor names, amounts of payments to the vendors, times of day of the payments, or locations of vendors of the first set of vendors and the second set of vendors, as described above.

As further shown in FIG. 4, process 400 may include determining first relative weightings for respective vendors within the first subsets and second relative weightings for respective vendors within the second subsets based on one or more of a quantity of payments to the respective vendors, a quantity of payments to the respective vendors within a time period, or a timing of a most recent payment to the respective vendors (block 430). For example, the device (e.g., using processor 320, memory 330, storage component 340, input component 350, output component 360, communication interface 370 and/or the like) may determine first relative weightings for respective vendors within the first subsets and second relative weightings for respective vendors within the second subsets based on one or more of a quantity of payments to the respective vendors, a quantity of payments to the respective vendors within a time period, or a timing of a most recent payment to the respective vendors, as described above.

As further shown in FIG. 4, process 400 may include receiving a request for a vendor recommendation for a meeting between the first user and the second user, wherein the request identifies parameters for the meeting, and wherein the parameters comprise one or more of a time of the meeting, a meeting type, a vendor type, a geographical area for the meeting, or a desired price range for the meeting (block 440). For example, the device (e.g., using processor 320, memory 330, storage component 340, input component 350, output component 360, communication interface 370 and/or the like) may receive a request for a vendor recommendation for a meeting between the first user and the second user, as described above. In some implementations, the request identifies parameters for the meeting. In some implementations, the parameters comprise one or more of a time of the meeting, a meeting type, a vendor type, a geographical area for the meeting, or a desired price range for the meeting.

As further shown in FIG. 4, process 400 may include generating the vendor recommendation for the meeting by identifying candidate vendors based on the parameters for the meeting and selecting one or more of the candidate vendors based on the first relative weightings and the second relative weightings (block 450). For example, the device (e.g., using processor 320, memory 330, storage component 340, input component 350, output component 360, communication interface 370 and/or the like) may generate the vendor recommendation for the meeting by identifying candidate vendors based on the parameters for the meeting and selecting one or more of the candidate vendors based on the first relative weightings and the second relative weightings, as described above.

As further shown in FIG. 4, process 400 may include providing, to at least one of the first user device or the second user device, the vendor recommendation for the meeting (block 460). For example, the device (e.g., using processor 320, memory 330, storage component 340, input component 350, output component 360, communication interface 370 and/or the like) may provide, to at least one of the first user device or the second user device, the vendor recommendation for the meeting, as described above.

Process 400 may include additional implementations, such as any single implementation or any combination of implementations described below and/or in connection with one or more other processes described elsewhere herein.

In a first implementation, the vendor recommendation includes a justification for the vendor recommendation, and the justification for the vendor recommendation identifies information regarding at least one of the first payments or the second payments.

In a second implementation, alone or in combination with the first implementation, process 400 further includes receiving, from at least one of the first user device or the second user device, an indication of a privacy level for the justification of the vendor recommendation, and the privacy level corresponds to an amount of personal information, from the first payments or the second payments, to be included with the justification.

In a third implementation, alone or in combination with one or more of the first and second implementations, process 400 further includes: receiving, from the first user device, first authorization information that is usable to access the payment data of the first payment account; receiving, from the second user device, second authorization information that is usable to access the payment data of the second payment account; providing, to a first payment account device, a first request to access the payment data of the first payment account, wherein the first request includes the first authorization information; and providing, to a second payment account device, a second request to access the payment data of the second payment account, wherein the second request includes the second authorization information.

In a fourth implementation, alone or in combination with one or more of the first through third implementations, at least one of the first authorization information or the second authorization information comprise an open authorization (oAuth) token that provides limited access to the payment data of the first payment account or the payment data of the second payment account.

In a fifth implementation, alone or in combination with one or more of the first through fourth implementations, at least one of the first authorization information or the second authorization information provide limited access to the first payment data or the second payment data, the limited access is limited to transactions with vendors related to meetings, and the vendors are determined to be related to meetings based on a vendor type of the vendor.

In a sixth implementation, alone or in combination with one or more of the first through fifth implementations, process 400 further includes providing, to at least one of the first user device or the second user device, an interface for requesting, from a vendor associated with the vendor recommendation, a reservation for the meeting.

In a seventh implementation, alone or in combination with one or more of the first through sixth implementations, the vendor recommendation identifies a recommended vendor for the meeting, and the method further comprises: determining one or more incentives associated with the recommended vendor, and providing, to at least one of the first user device or the second user device, an indication of the one or more incentives associated with the recommended vendor.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
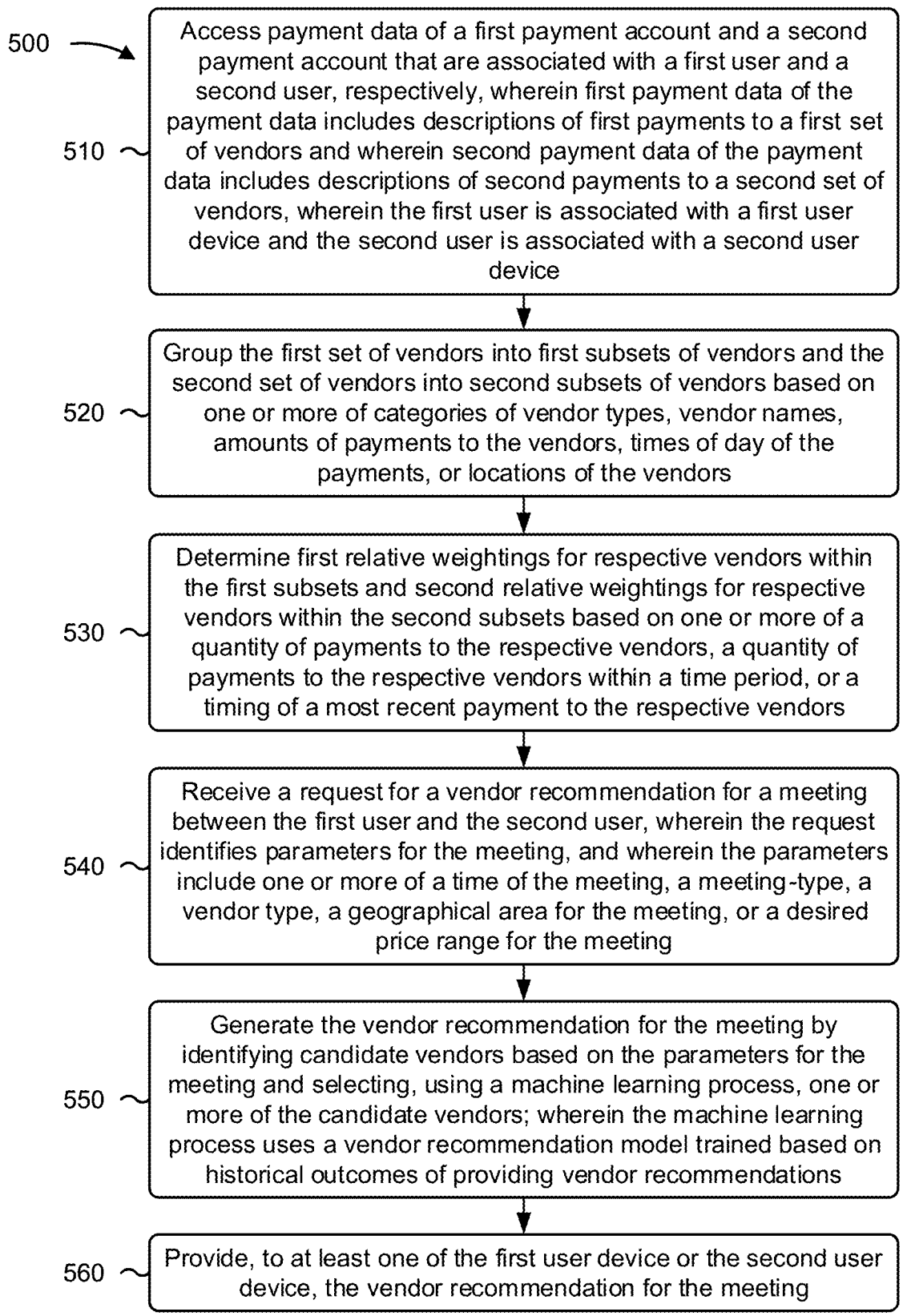

FIG. 5 is a flow chart of an example process 500 for generating a vendor recommendation for a meeting. In some implementations, one or more process blocks of FIG. 5 may be performed by a device (e.g., vendor recommendation platform 230). In some implementations, one or more process blocks of FIG. 5 may be performed by another device or a group of devices separate from or including the device, such as a user device (e.g., user device 210), a payment account device (e.g., payment account device 220), and/or the like.

As shown in FIG. 5, process 500 may include accessing payment data of a first payment account and a second payment account that are associated with a first user and a second user, respectively, wherein first payment data of the payment data includes descriptions of first payments to a first set of vendors, and wherein the first user is associated with a first user device and the second user is associated with a second user device (block 510). For example, the device (e.g., using processor 320, memory 330, storage component 340, input component 350, output component 360, communication interface 370 and/or the like) may access payment data of a first payment account and a second payment account that are associated with a first user and a second user, respectively, as described above. In some implementations, first payment data of the payment data includes descriptions of first payments to a first set of vendors. In some implementations, second payment data of the payment data includes descriptions of second payments to a second set of vendors. In some implementations, the first user is associated with a first user device and the second user is associated with a second user device.

As further shown in FIG. 5, process 500 may include grouping the first set of vendors into first subsets of vendors and the second set of vendors into second subsets of vendors based on one or more of categories of vendor types, vendor names, amounts of payments to the vendors, times of day of the payments, or locations of the vendors (block 520). For example, the device (e.g., using processor 320, memory 330, storage component 340, input component 350, output component 360, communication interface 370 and/or the like) may group the first set of vendors into first subsets of vendors and the second set of vendors into second subsets of vendors based on one or more of categories of vendor types, vendor names, amounts of payments to the vendors, times of day of the payments, or locations of the vendors, as described above.

As further shown in FIG. 5, process 500 may include determining first relative weightings for respective vendors within the first subsets and second relative weightings for respective vendors within the second subsets based on one or more of a quantity of payments to the respective vendors, a quantity of payments to the respective vendors within a time period, or a timing of a most recent payment to the respective vendors (block 530). For example, the device (e.g., using processor 320, memory 330, storage component 340, input component 350, output component 360, communication interface 370 and/or the like) may determine first relative weightings for respective vendors within the first subsets and second relative weightings for respective vendors within the second subsets based on one or more of a quantity of payments to the respective vendors, a quantity of payments to the respective vendors within a time period, or a timing of a most recent payment to the respective vendors, as described above.

As further shown in FIG. 5, process 500 may include receiving a request for a vendor recommendation for a meeting between the first user and the second user, wherein the request identifies parameters for the meeting, and wherein the parameters include one or more of a time of the meeting, a meeting type, a vendor type, a geographical area for the meeting, or a desired price range for the meeting (block 540). For example, the device (e.g., using processor 320, memory 330, storage component 340, input component 350, output component 360, communication interface 370 and/or the like) may receive a request for a vendor recommendation for a meeting between the first user and the second user, as described above. In some implementations, the request identifies parameters for the meeting. In some implementations, the parameters include one or more of a time of the meeting, a meeting type, a vendor type, a geographical area for the meeting, or a desired price range for the meeting.

As further shown in FIG. 5, process 500 may include generating the vendor recommendation for the meeting by identifying candidate vendors based on the parameters for the meeting and selecting, using a machine learning process, one or more of the candidate vendors, wherein the machine learning process uses a vendor recommendation model trained based on historical outcomes of providing vendor recommendations (block 550). For example, the device (e.g., using processor 320, memory 330, storage component 340, input component 350, output component 360, communication interface 370 and/or the like) may generate the vendor recommendation for the meeting by identifying candidate vendors based on the parameters for the meeting and selecting, using a machine learning process, one or more of the candidate vendors, as described above. In some implementations, the machine learning process uses a vendor recommendation model trained based on historical outcomes of providing vendor recommendations.

As further shown in FIG. 5, process 500 may include providing, to at least one of the first user device or the second user device, the vendor recommendation for the meeting (block 560). For example, the device (e.g., using processor 320, memory 330, storage component 340, input component 350, output component 360, communication interface 370 and/or the like) may provide, to at least one of the first user device or the second user device, the vendor recommendation for the meeting, as described above.

Process 500 may include additional implementations, such as any single implementation or any combination of implementations described below and/or in connection with one or more other processes described elsewhere herein.

In a first implementation, the vendor recommendation comprises identifications of one or more alternative vendors for the meeting and the one or more alternative vendors are selectable by at least one of the first user device or the second user device.

In a second implementation, alone or in combination with the first implementation, process 500 further includes receiving an indication of a selection of an alternative vendor of the one or more alternative vendors, and updating the vendor recommendation model based on the selection of the alternative vendor.

In a third implementation, alone or in combination with one or more of the first and second implementations, process 500 further includes providing, to at least one of the first user device or the second user device, an interface for requesting, from a vendor associated with the vendor recommendation, a reservation for the meeting.

In a fourth implementation, alone or in combination with one or more of the first through third implementations, the vendor recommendation identifies a recommended vendor for the meeting, and process 500 further includes determining one or more incentives associated with the recommended vendor, and providing, to at least one of the first user device or the second user device, an indication of the one or more incentives associated with the recommended vendor.

In a fifth implementation, alone or in combination with one or more of the first through fourth implementations, a subset of the first subsets of vendors includes a first set of restaurants and a subset of the second subsets of vendors includes a second set of restaurants, the parameters for the meeting define a vendor type as a restaurant, and process 500 further includes: grouping the first set of restaurants and the second set of restaurants by types of food; determining third relative weightings for types of food within the subset of the first subsets of vendors and determining fourth relative weightings for types of food within the subset of the second subsets of vendors; and selecting one or more types of food based on the third relative weightings and the fourth relative weightings, wherein, to generate the vendor recommendation for the meeting, process 500 further include identifying the candidate vendors based on the one or more types of food.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
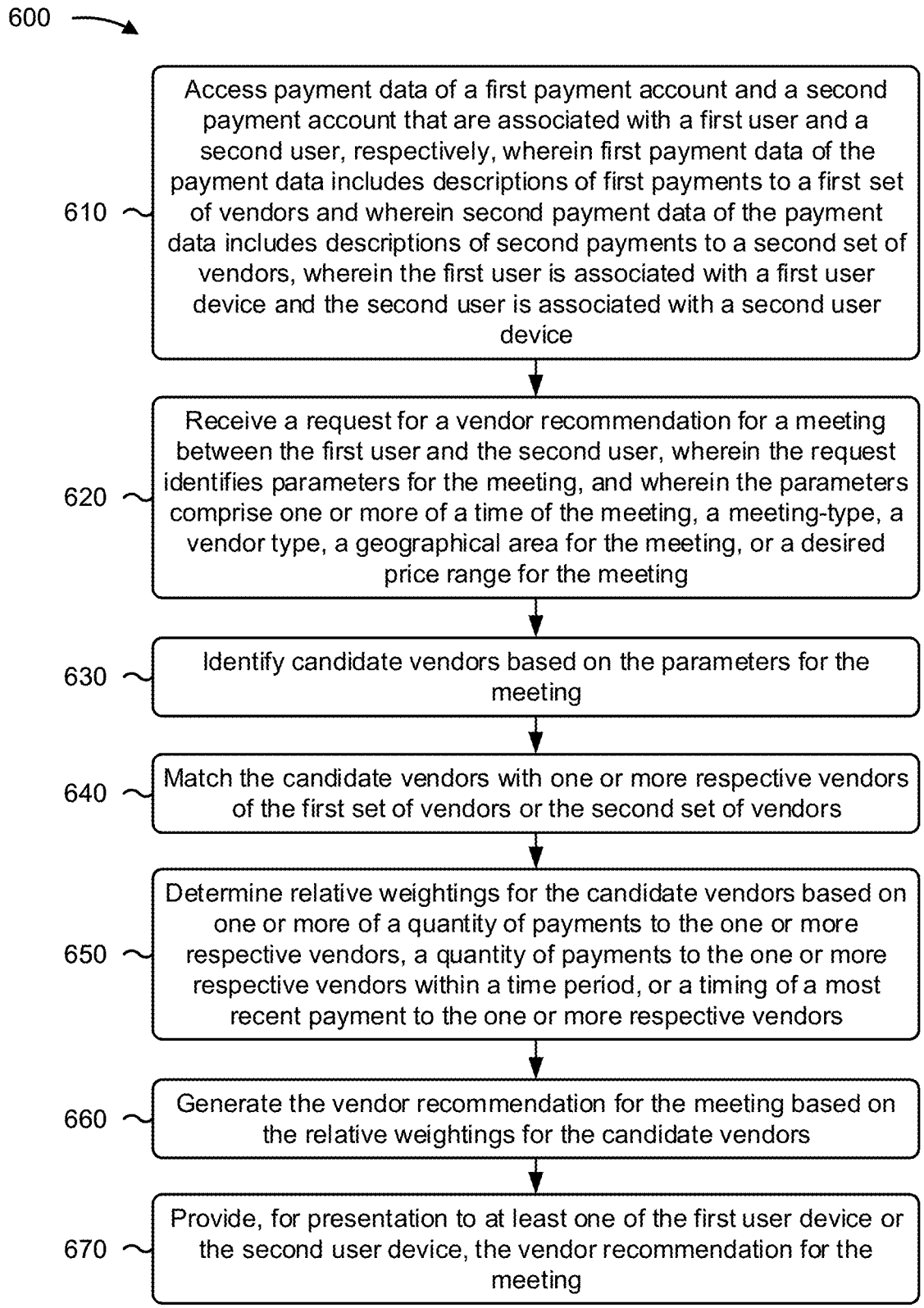

FIG. 6 is a flow chart of an example process 600 for generating a vendor recommendation for a meeting. In some implementations, one or more process blocks of FIG. 6 may be performed by a device (e.g., vendor recommendation platform 230). In some implementations, one or more process blocks of FIG. 6 may be performed by another device or a group of devices separate from or including the device, such as a user device (e.g., user device 210), a payment account device (e.g., payment account device 220), and/or the like.

As shown in FIG. 6, process 600 may include accessing payment data of a first payment account and a second payment account that are associated with a first user and a second user, respectively, wherein first payment data of the payment data includes descriptions of first payments to a first set of vendors, and wherein the first user is associated with a first user device and the second user is associated with a second user device (block 610). For example, the device (e.g., using processor 320, memory 330, storage component 340, input component 350, output component 360, communication interface 370 and/or the like) may access payment data of a first payment account and a second payment account that are associated with a first user and a second user, respectively, as described above. In some implementations, first payment data of the payment data includes descriptions of first payments to a first set of vendors. In some implementations, second payment data of the payment data includes descriptions of second payments to a second set of vendors. In some implementations, the first user is associated with a first user device and the second user is associated with a second user device.

As further shown in FIG. 6, process 600 may include receiving a request for a vendor recommendation for a meeting between the first user and the second user, wherein the request identifies parameters for the meeting, and wherein the parameters comprise one or more of a time of the meeting, a meeting type, a vendor type, a geographical area for the meeting, or a desired price range for the meeting (block 620). For example, the device (e.g., using processor 320, memory 330, storage component 340, input component 350, output component 360, communication interface 370 and/or the like) may receive a request for a vendor recommendation for a meeting between the first user and the second user, as described above. In some implementations, the request identifies parameters for the meeting. In some implementations, the parameters comprise one or more of a time of the meeting, a meeting type, a vendor type, a geographical area for the meeting, or a desired price range for the meeting.

As further shown in FIG. 6, process 600 may include identifying candidate vendors based on the parameters for the meeting (block 630). For example, the device (e.g., using processor 320, memory 330, storage component 340, input component 350, output component 360, communication interface 370 and/or the like) may identify candidate vendors based on the parameters for the meeting, as described above.

As further shown in FIG. 6, process 600 may include matching the candidate vendors with one or more respective vendors of the first set of vendors or the second set of vendors (block 640). For example, the device (e.g., using processor 320, memory 330, storage component 340, input component 350, output component 360, communication interface 370 and/or the like) may match the candidate vendors with one or more respective vendors of the first set of vendors or the second set of vendors, as described above.

As further shown in FIG. 6, process 600 may include determining relative weightings for the candidate vendors based on one or more of a quantity of payments to the one or more respective vendors, a quantity of payments to the one or more respective vendors within a time period, or a timing of a most recent payment to the one or more respective vendors (block 650). For example, the device (e.g., using processor 320, memory 330, storage component 340, input component 350, output component 360, communication interface 370 and/or the like) may determine relative weightings for the candidate vendors based on one or more of a quantity of payments to the one or more respective vendors, a quantity of payments to the one or more respective vendors within a time period, or a timing of a most recent payment to the one or more respective vendors, as described above.

As further shown in FIG. 6, process 600 may include generating the vendor recommendation for the meeting based on the relative weightings for the candidate vendors (block 660). For example, the device (e.g., using processor 320, memory 330, storage component 340, input component 350, output component 360, communication interface 370 and/or the like) may generate the vendor recommendation for the meeting based on the relative weightings for the candidate vendors, as described above.

As further shown in FIG. 6, process 600 may include providing, for presentation to at least one of the first user device or the second user device, the vendor recommendation for the meeting (block 670). For example, the device (e.g., using processor 320, memory 330, storage component 340, input component 350, output component 360, communication interface 370 and/or the like) may provide, for presentation to at least one of the first user device or the second user device, the vendor recommendation for the meeting, as described above.

Process 600 may include additional implementations, such as any single implementation or any combination of implementations described below and/or in connection with one or more other processes described elsewhere herein.

In a first implementation, the one or more instructions, when executed by the one or more processors, further cause the one or more processors to match the candidate vendors with the one or more respective vendors based on having common characteristics, and the common characteristics comprise one or more of a vendor type, a vendor name, an expected cost range, or a location.

In a second implementation, alone or in combination with the first implementation, the first set of vendors and the second set of vendors comprise restaurants, process 600 further includes matching the candidate vendors with the one or more respective vendors based on having common characteristics, and the common characteristics comprise one or more of a type of food, a vendor name, an expected cost range, or a location.

In a third implementation, alone or in combination with one or more of the first and second implementations, the vendor recommendation comprises identifications of one or more alternative vendors for the meeting, and the one or more alternative vendors are selectable by at least one of the first user device or the second user device.

In a fourth implementation, alone or in combination with one or more of the first through third implementations, process 600 further includes providing, to at least one of the first user device or the second user device, an interface for requesting, from a vendor associated with the vendor recommendation, a reservation for the meeting.

In a fifth implementation, alone or in combination with one or more of the first through fourth implementations, the vendor recommendation identifies a recommended vendor for the meeting, and process 600 further includes determining one or more incentives associated with the vendor, and providing, to at least one of the first user device or the second user device, an indication of the one or more incentives associated with the vendor.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
   one or more memories; and
   one or more processors, communicatively coupled to the one or more memories, configured to:
   access payment data of a first payment account and a second payment account that are associated with a first user and a second user, respectively, using an open authorization (oAuth) token that provides limited access to at least one of the payment data of the first payment account or the payment data of the second payment account,
   wherein the limited access includes limiting access to the device based on determining transactions associated with vendors related to meetings,
   wherein first payment data of the payment data includes descriptions of first payments to a first set of vendors and wherein second payment data of the payment data includes descriptions of second payments to a second set of vendors, and
   wherein the first user is associated with a first user device and the second user is associated with a second user device;
   group the first set of vendors into first subsets of vendors and the second set of vendors into second subsets of vendors based on one or more of categories of vendor types, vendor names, amounts of payments to vendors, times of day of payments, or locations of vendors, and
   wherein the one or more processors, when grouping the first set of vendors and the second set of vendors, are to use natural language processing of the descriptions of the first payments to the first set of vendors and the descriptions of the second payments to the second set of vendors to determine the one or more of the categories of the vendor types, the vendor names, the amounts of payments to vendors, the times of day of payments, or the locations of vendors;
   determine first relative weightings for respective vendors within the first subsets and second relative weightings for respective vendors within the second subsets based on one or more of a quantity of payments to the respective vendors, a quantity of payments to the respective vendors within a time period, or a timing of a most recent payment to the respective vendors;
   receive a request for a vendor recommendation for a meeting between the first user and the second user,
   wherein the request identifies a privacy level and parameters for the meeting, and
   wherein the parameters include one or more of a time of the meeting, a meeting type, a vendor type, a geographical area for the meeting, or a desired price range for the meeting;
   generate the vendor recommendation for the meeting by identifying candidate vendors based on the parameters for the meeting and selecting, using a machine learning process, one or more of the candidate vendors,
   wherein the machine learning process uses a vendor recommendation model trained based on historical outcomes of providing vendor recommendations; and
   provide, to at least one of the first user device or the second user device, the vendor recommendation for the meeting,
   wherein the vendor recommendation includes a justification for the vendor recommendation,
   wherein the justification for the vendor recommendation identifies information regarding at least one of the first payments or the second payments, and
   wherein an amount of personal information, from the first payments or the second payments, to be included with the justification corresponds to the privacy level.

2. The device of claim 1, wherein the vendor recommendation comprises identification of one or more alternative vendors for the meeting, and
   wherein the one or more alternative vendors are selectable by at least one of the first user device or the second user device.

3. The device of claim 2, wherein the one or more processors are further configured to:
   receive an indication of a selection of an alternative vendor of the one or more alternative vendors, and
   update the vendor recommendation model based on the selection of the alternative vendor.

4. The device of claim 1, wherein the one or more processors are further configured to:
   provide, to at least one of the first user device or the second user device, an interface for requesting, from a vendor associated with the vendor recommendation, a reservation for the meeting.

5. The device of claim 1, wherein the vendor recommendation identifies a recommended vendor for the meeting,
   wherein the one or more processors are further configured to:
      determine one or more incentives associated with the recommended vendor, and
      provide, to at least one of the first user device or the second user device, an indication of the one or more incentives associated with the recommended vendor.

6. The device of claim 1, wherein a subset of the first subsets of vendors includes a first set of restaurants and a subset of the second subsets of vendors includes a second set of restaurants,
   wherein the parameters for the meeting define a vendor type as a restaurant,
   wherein the one or more processors are further configured to:
      group the first set of restaurants and the second set of restaurants by types of food;
      determine third relative weightings for types of food within the subset of the first subsets of vendors and determine fourth relative weightings for types of food within the subset of the second subsets of vendors; and
      select one or more types of food based on the third relative weightings and the fourth relative weightings, and
   wherein to generate the vendor recommendation for the meeting, the one or more processors are configured to identify the candidate vendors based on the one or more types of food.

7. The device of claim 1, wherein the vendor recommendation includes a justification for the vendor recommendation that identifies information regarding at least one of the first payments or the second payments.

8. A non-transitory computer-readable medium storing a set of instructions, the set of instructions comprising:
   one or more instructions that, when executed by one or more processors of a device, cause the device to:
      access payment data of a first payment account and a second payment account that are associated with a first user and a second user, respectively, using an open authorization (oAuth) token that provides limited access to at least one of the payment data of the first payment account or the payment data of the second payment account,
         wherein the limited access includes limiting access to the device based on determining transactions associated with vendors related to meetings, and
         wherein first payment data of the payment data includes descriptions of first payments to a first set of vendors and wherein second payment data of the payment data includes descriptions of second payments to a second set of vendors, and
      wherein the first user is associated with a first user device and the second user is associated with a second user device;
      group the first set of vendors into first subsets of vendors and the second set of vendors into second subsets of vendors based on one or more of categories of vendor types, vendor names, amounts of payments to vendors, times of day of payments, or locations of vendors,
         wherein the one or more instructions, that cause the device to group the first set of vendors and the second set of vendors, cause the device to use natural language processing of the descriptions of the first payments and the descriptions of the second payments to determine the one or more categories of the vendor types, the vendor names, the amounts of payments to vendors, the times of day of payments, or the locations of vendors;
      determine first relative weightings for respective vendors within the first subsets and second relative weightings for respective vendors within the second subsets based on one or more of a quantity of payments to the respective vendors, a quantity of payments to the respective vendors within a time period, or a timing of a most recent payment to the respective vendors;
      receive a request for a vendor recommendation for a meeting between the first user and the second user,
         wherein the request identifies a privacy level and parameters for the meeting, and
         wherein the parameters include one or more of a time of the meeting, a meeting type, a vendor type, a geographical area for the meeting, or a desired price range for the meeting;
      generate the vendor recommendation for the meeting by identifying candidate vendors based on the parameters for the meeting and selecting, using a machine learning process, one or more of the candidate vendors,
         wherein the machine learning process uses a vendor recommendation model trained based on historical outcomes of providing vendor recommendations; and
      provide, to at least one of the first user device or the second user device, the vendor recommendation for the meeting,
         wherein the vendor recommendation includes a justification for the vendor recommendation,
            wherein the justification for the vendor recommendation identifies information regarding at least one of the first payments or the second payments, and
            wherein an amount of personal information, from the first payments or the second payments, to be included with the justification corresponds to the privacy level.

9. The non-transitory computer-readable medium of claim 8, wherein the vendor recommendation comprises identification of one or more alternative vendors for the meeting, and
   wherein the one or more alternative vendors are selectable by at least one of the first user device or the second user device.

10. The non-transitory computer-readable medium of claim 9, wherein the one or more instructions further cause the device to:

receive an indication of a selection of an alternative vendor of the one or more alternative vendors, and update the vendor recommendation model based on the selection of the alternative vendor.

11. The non-transitory computer-readable medium of claim 8, wherein the one or more instructions further cause the device to:

provide, to at least one of the first user device or the second user device, an interface for requesting, from a vendor associated with the vendor recommendation, a reservation for the meeting.

12. The non-transitory computer-readable medium of claim 8, wherein the vendor recommendation identifies a recommended vendor for the meeting, wherein the one or more instructions further cause the device to:

determine one or more incentives associated with the recommended vendor, and provide, to at least one of the first user device or the second user device, an indication of the one or more incentives associated with the recommended vendor.

13. The non-transitory computer-readable medium of claim 8, wherein a subset of the first subsets of vendors includes a first set of restaurants and a subset of the second subsets of vendors includes a second set of restaurants, wherein the parameters for the meeting define a vendor type as a restaurant, wherein the one or more instructions further cause the device to:

group the first set of restaurants and the second set of restaurants by types of food;

determine third relative weightings for types of food within the subset of the first subsets of vendors and determine fourth relative weightings for types of food within the subset of the second subsets of vendors; and select one or more types of food based on the third relative weightings and the fourth relative weightings, and wherein to generate the vendor recommendation for the meeting, the one or more processors are configured to identify the candidate vendors based on the one or more types of food.

14. The non-transitory computer-readable medium of claim 8, wherein the vendor recommendation includes a justification for the vendor recommendation, wherein the justification for the vendor recommendation identifies information regarding at least one of the first payments or the second payments.

15. A method, comprising:

accessing, by a device, payment data of a first payment account and a second payment account that are associated with a first user and a second user, respectively, using an open authorization (oAuth) token that provides limited access to at least one of the payment data of the first payment account or the payment data of the second payment account, wherein the limited access includes limiting access to the device based on determining transactions associated with vendors related to meetings, wherein first payment data of the payment data includes descriptions of first payments to a first set of vendors and wherein second payment data of the payment data includes descriptions of second payments to a second set of vendors, and wherein the first user is associated with a first user device and the second user is associated with a second user device;

grouping, by the device, the first set of vendors into first subsets of vendors and the second set of vendors into second subsets of vendors based on one or more of categories of vendor types, vendor names, amounts of payments to vendors, times of day of payments, or locations of vendors, wherein grouping the first set of vendors and the second set of vendors comprises using natural language processing of the descriptions of the first payments and the descriptions of the second payments determine the one or more of the categories of the vendor types, the vendor names, the amounts of payments to vendors, the times of day of payments, or the locations of vendors;

determining, by the device, first relative weightings for respective vendors within the first subsets and second relative weightings for respective vendors within the second subsets based on one or more of a quantity of payments to the respective vendors, a quantity of payments to the respective vendors within a time period, or a timing of a most recent payment to the respective vendors;

receiving, by the device, a request for a vendor recommendation for a meeting between the first user and the second user, wherein the request identifies a privacy level and parameters for the meeting, and wherein the parameters include one or more of a time of the meeting, a meeting type, a vendor type, a geographical area for the meeting, or a desired price range for the meeting;

generating, by the device, the vendor recommendation for the meeting by identifying candidate vendors based on the parameters for the meeting and selecting, using a machine learning process, one or more of the candidate vendors, wherein the machine learning process uses a vendor recommendation model trained based on historical outcomes of providing vendor recommendations; and providing, by the device and to at least one of the first user device or the second user device, the vendor recommendation for the meeting, wherein the vendor recommendation includes a justification for the vendor recommendation, wherein the justification for the vendor recommendation identifies information regarding at least one of the first payments or the second payments, and wherein an amount of personal information, from the first payments or the second payments, to be included with the justification corresponds to the privacy level.

16. The method of claim 15, wherein the vendor recommendation comprises identification of one or more alternative vendors for the meeting, and wherein the one or more alternative vendors are selectable by at least one of the first user device or the second user device.

17. The method of claim 16, further comprising:

receiving an indication of a selection of an alternative vendor of the one or more alternative vendors, and updating the vendor recommendation model based on the selection of the alternative vendor.

18. The method of claim 15, further comprising:
provicling, to at least one of the first user device or the second user device, an interface for requesting, from a vendor associated with the vendor recommendation, a reservation for the meeting.

19. The method of claim 15, wherein the vendor recommendation identifies a recommended vendor for the meeting, and
wherein the method further comprises:
determining one or more incentives associated with the recommended vendor, and
providing, to at least one of the first user device or the second user device, an indication of the one or more incentives associated with the recommended vendor.

20. The method of claim 15, wherein
a subset of the first subsets of vendors includes a first set of restaurants and a subset of the second subsets of vendors includes a second set of restaurants,
the parameters for the meeting define a vendor type as a restaurant, and
the method further comprises:
grouping the first set of restaurants and the second set of restaurants by types of food;
determining third relative weightings for types of food within the subset of the first subsets of vendors and determine fourth relative weightings for types of food within the subset of the second subsets of vendors; and
selecting one or more types of food based on the third relative weightings and the fourth relative weightings.

* * * * *